(12) United States Patent
Ketchum

(10) Patent No.: US 8,117,067 B2
(45) Date of Patent: Feb. 14, 2012

(54) ACHIEVING ADVERTISING CAMPAIGN GOALS

(75) Inventor: Russell K. Ketchum, Newport Beach, CA (US)

(73) Assignee: Google Inc., Mountain View, CA (US)

( * ) Notice: Subject to any disclaimer, the term of this patent is extended or adjusted under 35 U.S.C. 154(b) by 566 days.

(21) Appl. No.: 12/139,338

(22) Filed: Jun. 13, 2008

(65) Prior Publication Data

US 2011/0161162 A1    Jun. 30, 2011

(51) Int. Cl.
    *G06Q 30/00* (2006.01)
    *G06Q 40/00* (2006.01)

(52) U.S. Cl. .................... 705/14.4; 705/35; 705/14.41

(58) Field of Classification Search ............ 705/14.72, 705/14.73, 14.41, 14.42, 14.43, 14.44, 14.45, 705/14.68, 35, 14.4, 14.13
See application file for complete search history.

(56) References Cited

U.S. PATENT DOCUMENTS

| | | | |
|---|---|---|---|
| 5,724,521 A | 3/1998 | Dedrick | |
| 5,948,061 A | 9/1999 | Merriman et al. | |
| 6,167,382 A | 12/2000 | Sparks et al. | |
| 6,401,075 B1 | 6/2002 | Mason et al. | |
| 6,985,882 B1 | 1/2006 | Del Soto | |
| 7,124,091 B1 | 10/2006 | Khoo et al. | |
| 2001/0020236 A1* | 9/2001 | Cannon .............................. 707/1 |
| 2004/0073484 A1* | 4/2004 | Camporeale et al. ........... 705/14 |
| 2005/0021395 A1 | 1/2005 | Luu | |
| 2006/0026060 A1* | 2/2006 | Collins ........................... 705/14 |
| 2006/0026061 A1* | 2/2006 | Collins ........................... 705/14 |
| 2006/0026063 A1* | 2/2006 | Collins ........................... 705/14 |
| 2006/0026064 A1* | 2/2006 | Collins ........................... 705/14 |
| 2006/0271438 A1 | 11/2006 | Shotland et al. | |
| 2007/0027754 A1* | 2/2007 | Collins et al. .................. 705/14 |
| 2007/0027756 A1* | 2/2007 | Collins et al. .................. 705/14 |
| 2007/0027759 A1* | 2/2007 | Collins et al. .................. 705/14 |
| 2007/0027760 A1* | 2/2007 | Collins et al. .................. 705/14 |
| 2007/0027761 A1* | 2/2007 | Collins et al. .................. 705/14 |
| 2007/0027762 A1* | 2/2007 | Collins et al. .................. 705/14 |
| 2007/0027765 A1* | 2/2007 | Collins et al. .................. 705/14 |
| 2007/0027766 A1* | 2/2007 | Collins et al. .................. 705/14 |
| 2007/0027768 A1* | 2/2007 | Collins et al. .................. 705/14 |
| 2007/0027770 A1* | 2/2007 | Collins et al. .................. 705/14 |
| 2007/0027771 A1* | 2/2007 | Collins et al. .................. 705/14 |
| 2007/0027864 A1* | 2/2007 | Collins et al. ..................... 707/5 |
| 2007/0027865 A1* | 2/2007 | Bartz et al. ........................ 707/5 |
| 2007/0033103 A1* | 2/2007 | Collins et al. .................. 705/14 |

(Continued)

FOREIGN PATENT DOCUMENTS

WO    WO 97/21183    6/1997

OTHER PUBLICATIONS

Hoefges et al. "The critical role of advertising media planning in federal rule 23 class action notice" Fall 2000 Journal of Public Policy & Marketing v19n2 pp. 201-212.*

(Continued)

*Primary Examiner* — Kelly Campen
(74) *Attorney, Agent, or Firm* — Fish & Richardson P.C.

(57) ABSTRACT

Various aspects can be implemented for achieving advertising campaign goals. One aspect can be a method that includes receiving an advertising goal for a broadcast advertising campaign, translating the advertising goal into one or more rules, and automatically calculating campaign settings based on the one or more rules. Other implementations of this aspect include corresponding systems, apparatus, and computer program products.

17 Claims, 14 Drawing Sheets

U.S. PATENT DOCUMENTS

| | | | |
|---|---|---|---|
| 2007/0033104 A1* | 2/2007 | Collins et al. | 705/14 |
| 2007/0033105 A1* | 2/2007 | Collins et al. | 705/14 |
| 2007/0121843 A1* | 5/2007 | Atazky et al. | 379/114.13 |
| 2007/0143186 A1 | 6/2007 | Apple et al. | |
| 2007/0156525 A1 | 7/2007 | Grouf et al. | |
| 2008/0052150 A1 | 2/2008 | Grouf et al. | |
| 2008/0097813 A1 | 4/2008 | Collins et al. | |
| 2008/0249855 A1* | 10/2008 | Collins et al. | 705/14 |
| 2008/0255915 A1* | 10/2008 | Collins et al. | 705/8 |
| 2009/0006145 A1 | 1/2009 | Duggal et al. | |
| 2009/0248478 A1* | 10/2009 | Duggal et al. | 705/8 |

OTHER PUBLICATIONS

Jin et al. "Examining effects of advertising campaign publicity in a field study." Jun. 2006 Journal of Advertising Research , 46 , 2 , 171(12).*

Zeff, R. and Aronson, B., *"Advertising on the Internet,"* second edition, pp. 1-436 (1999).

Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet URL:http://web.archive.org/web/20000819020800/www.ccrl.com/adwiz/adwiz-www8.html.

Adknowledge Primary Services, Customer Reference Guide. pp. 1-90, 2000.

Accipiter, Inc., "Accipiter announces Accipiter AdManager, a breakthrough in Internet advertising and marketing" [Online], [retrieved on Apr. 1, 2008]. Retrieved from the Internet <URL: http://web.archive.org/web/19980201092220/www.accipiter.com/press/releases/pr_adman10.htm> Sep. 9, 1996.

Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.

Engage Technologies, Accipiter, "AdManager Frequently Asked Questions." [Online], [retrieved Apr. 1, 2008]. Retrieved from the Internet <URL:http://web.archive.org/web/19990208222457/www.accipiter.com/products/admanager/adm_faq.htm> Feb. 8, 1999.

Aaddzz Brokers Web Ad Space Sales Between Advertisers & Publishers, "The Best Way to Buy and Sell Web Advertising Space," 1997. [online] Retrieved from the Internet: URL:http://www.aaddzz.com.

Adforce, User Guide Version 2.6, "A Complete Guide to AdForce," 1998.

AdKnowledge Corporate Information, Company Overview, [online retrieved Aug. 16, 2007] Retrieved from URL:http://www.archive.org/web/19990128143110/www.adknowledge.com/corporate/index.html.

Adknowledge Customers, i-traffic, [Online], [retrieved Aug. 16, 2007] Retrieved from the Internet: <URLhttp://web.archive.org/web/19990503093107/www.adknowledge.com/aksystem/profile_itraffic.html>.

Adwiz by NEC, "The Artificial Intelligence Solution for Advertisement Targeting," [Online], [retrieved Apr. 1, 2008] Retrieved from the Internet: URL:http://web.archive.org/web/20000816042946/http://www.ccrl.com/adwiz/.

AdKnowledge, Inc., Campaign Manager, "Streamlines buying and trafficking while saving time and money," [Online], [retrieved Aug. 16, 2007] Retrieved from the internet: URL:http://web.archive.org/web/19990221080152/www.adknowledge.com/asksystem/campaign.html.

NEC Corporation, "ADWIZ Intelligent Advertisement Targeting.".

Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: URL:http://web.archive.org/web/19980130092746/www.aaddzz.com/pages/b-highlights.

Information Access Technologies, Inc., "Introduction to Aaddzz," [Online], [retrieved Apr. 15, 2008] Retrieved from the Internet: URL:http://web.archive.org/web/19980130092752/www.aaddzz.com/pages/b-intro.

Information Access Technologies, Inc., "Aaddzz Publishers," [Online], [retrieved Apr. 15, 2008] Retrieved from the Internet: URL:http://web.archive.org/web/19980130092758/www.aaddzz.com/pages/b-publish.

Information Access Technologies, Inc., "Aaddzz Advertisers," [Online], [retrieved Apr. 15, 2008] Retrieved from the Internet: URL:http://web.archive.org/web/19980130092804/www.aaddzz.com/pages/b-advertise.

Information Access Technologies, Inc., Aaddzz Ads, Spaces, & Places [Online], [retrieved Apr. 14, 2008] Retrieved from the Internet: URL:http://web.archive.org/web/19980130092810/www.aaddzz.com/pages/b-adspacesplaces.

Information Access Technologies, Inc., "Aaddzz Real-Time Reporting & Statements," [Online], [retrieved Apr. 15, 2008] Retrieved from the Internet: URL:http://web.archive.org/web/19980130092816/www.aaddzz.com/pages/b-realtime.

Information Access Technologies, Inc., "Aaddzz Buying Ad Space with Aaddzz," [Online], [retrieved Apr. 15, 2008] Retrieved from the Internet: URL:http://web.archive.org/web/19980130092822/www.aaddzz.com/pages/advertising.

Information Access Technologies, Inc., "Aaddzz Selling Ad Space With Aaddzz," [Online], [retrieved Apr. 15, 2008] Retrieved from the Internet: URL:http://web.archive.org/web/19980130092829/www.aaddzz.com/pages/selling.

Information Access Technologies, Inc., "Aaddzz Fees and Payments," [Online], [retrieved Apr. 15, 2008] Retrieved from the Internet: URL:http://web.archive.org/web/19980130092836/www.aaddzz.com/pages/pricing.

Information Access Technologies, Inc., "Aaddzz Ratings," [Online], [retrieved Apr. 15, 2008] Retrieved from the Internet: URL:http://web.archive.org/web/19980130092842/www.aaddzz.com/pages/ratings.

Information Access Technologies, Inc., "Aaddzz Ad Sizes," [Online], [retrieved Apr. 15, 2008] Retrieved from the Internet: URL:http://web.archive.org/web/19980130092848/wwww.aaddzz.com/pages/sizes.

Information Access Technologies, Inc., "Aaddzz Free Access Reports," [Online], [retrieved Apr. 15, 2008] Retrieved from the Internet: URL:http://web.archive.org/web/19980130092902/www.aaddzz.com/pages/reports.

Information Access Technologies, Inc., "Aaddzz Advanced Topics," [Online], [retrieved Apr. 15, 2008] Retrieved from the Internet: URL:http://web.archive.org/web/19980130092908/www.aaddzz.com/pages/advanced.

Information Access Technologies, Inc., "Aaddzz Frequently Asked Questions," [Online], [retrieved Apr. 15, 2008] Retrieved from the Internet: URL:http://web.archive.org/web/19980130092914/www.aaddzz.com/pages/faq.

Information Access Technologies, Inc., "Aaddzz Home Page," [Online], [retrieved Apr. 15, 2008] Retrieved from the Internet: URL:http://www.aaddz.com/letter.html.

NEC Corporation, NEC: Press Release "NEC announces ADWIZ, an Artificial Intelligence Solution for Advertisement Targeting Software on the World Wide Web," Jan. 8, 1999.

AdKnowledge Inc., "Comprehensive Planning," [Online], [retrieved on Aug. 16, 2007] Retrieved from the Internet: URL:http://web.archive.org/web/19990221144457/www.adknowledge.com/aksystem/planner.html.

AdKnowledge Inc., "Automates the targeting and serving of web advertising campaigns," [Online], [retrieved on Aug. 16, 2007] Retrieved from the Internet: URL:http://web.archive.org/web/19990222023416/www.adknowledge.com/aksystem/smartbanner.html.

IEEE Intelligent Systems, New Products, "Tell your computer where to go," United Kingdom, Jan./Feb. 1998.

AdKnowledge Inc., "The AdKnowledge System," [Online], [retrieved on Aug. 16, 2007] Retrieved from the Internet: URL:;http://web.archive.org/web/19990221115917/www.adknowledge.com/aksystem/index.html.

AdKnowledge Inc., Corporate Information "AdKnowledge Events," [Online], [retrieved on Aug. 16, 2007] Retrieved from the Internet: URL:http://web.archive.org/web/20000511005235/www.adknowledge.com/whatsnew/events.html.

NEC Corporation, ADWIZ White Paper, "Taking Online Ad Targeting to the Next Level," [Online], [retrieved on Apr. 15, 2008] Retrieved from the Internet: URL:http://web.archive.org/web/20010619222015/www.ccrl.com/adwiz/whitepaper.html.

ScanScout, "ScanScout in the News," [Online], [retrieved Apr. 16, 2008]. Retrieved from the Internet:URL:http://scanscout.com/.

Blinkx, "Video Search Engine—Blinkx," [Online], [retrieved Apr. 16, 2008]. Retrieved from the Internet: URL:http://blinkx.com/.

EveryZing, Inc., "Video SEO and Multimedia Search Solutions," [Online], [retrieved Apr. 16, 2008], Retrieved from the Internet: URL:http://everything.com/.

Inside Online Video, "Blinkx to Contextualize Video Ads Through Speech Recognition," Jun. 22, 2007 [Online], [retrieved Apr. 16, 2008] Retrieved from the Internet: URL:http://www.insideonlinevideo.com/20007/06/22/blinkx-to-contextualize-video-ads-through-speech-recognition/.

PCT Notification of Transmittal of the International Search Report and the Written Opinion of the International Searching Authority, or the Declaration in PCT/US2009/047259 dated Jan. 29, 2010.

PCT Notification of Transmittal of the International Search Report and the Written Opinion of the International Searching Authority, or the Declaration in PCT/US2009/047259 dated Jan. 29, 2010.

* cited by examiner

FIG. 6

610 — Name your campaign:
Audio Campaign #2
This name is for your use, to identify your campaigns. It may also be seen by radio stations. If this campaign is similar to one you have created previously, click here to copy those settings.

Primary campaign objective: ⌐611
Identify the primary marketing objective for this campaign. We will use this information to taylor the settings of your campaign to make it most effective for achieving your goal.

620 —
| Brand building ▲ | Brand maintenance campaigns emphasize reaching as |
| Brand maintenance | many listeners as possible in the most cost effective |
| Time-sensitive promotion ▼ | manner. |

630 — Demographic target:
Describe the age and gender of your target audience below. We will use this information to identify the stations that will reach your target listeners most efficiently.
  Gender: ☑ female  ☑ male
  Age range: [slider: 12-17 | 18-20 | 21-24 | 25-34 | 35-44 | 45-49 | 50-54 | 55-64 | 65+ ]
  Demographic data source: Arbitron, Jan, 2008

640 — Qualitative target:
Describe the social characteristics of your target audience below by describing the product being advertised or the audience itself. We will use this information to identify station types and markets that reach your intended audience most effectively.

643 — Primary:
Automotive
Beverage
Banking & Financial
Computer / Internet

646 — Secondary:
Home/Personal Computer
Own personal Digital Assistant (PDA)
Places or internet access past 30 days
Type of internet connection 649 — Tertiary:
Cable modem
Dial-up
DSL
Other connection 661 — Bid:  659 —
I am willing to pay up to $ [ 5.00 ] per thousand listeners (CPM)
Historic inventory cost: $2.50 -- $19.95
The historic inventory cost shows the range of winning CPMs required to reach your target listeners in the last seven days. The higher you bid, the more likely you are to win spots.

Inventory Restrictions: None
Allow us to select the best inventory to reach my target listener and accomplish my campaign objective. Show Inventory Restriction Options.
⌐664

[ Cancel ]  [ Next ]

Name your campaign:
Audio Campaign #2

Inventory Restrictions

807 — ☑ Restrict Inventory by Station Format

Select: <u>All</u> — <u>None</u>

- ☑ ▸Adult Contemporary (17 stations)
- ☑ ▸Easy Listening (no stations yet)
- ☑ ▸Religious (1 station)
- ☑ ▸Talk (no stations yet)
- ☑ ▸Classical (1 station)
- ☑ ▸Oldies (9 stations)
- ☑ ▸Spanish (2 stations)
- ☑ ▸Variety/Other (no stations yet)

- ☑ ▸Children (no stations yet)
- ☑ ▸News (14 stations)
- ☑ ▸Rock (14 stations)
- ☑ ▸Urban (1 station)
- ☑ ▸Country (20 stations)
- ☑ ▸Pop (8 stations)
- ☑ ▸Sports (3 stations)

811 — ☑ Restrict Inventory by Days of Week       Date Range: #1 ▼

Weekdays:                                                   Weekends:
812 — [14]% Mon [14]% Tue [14]% Wed [14]% Thu [14]% Fri | [15]% Sat [15]% Sun
813 — ○ Maximize impressions for each day
     ● Enter specific percentage of overall impressions for days above If availability is low for a selected day of the week:

814 — Adhere exactly to my percentages. [=========]  Reach as many listeners as possible by increasing non-zero percentages.

820 — ☑ Restrict Inventory by Days of Week       Date Range: #1 ▼

Weekdays:                                                    Weekends:
6am  10am  3pm  7pm  12am  6am  |  6am   12am   6am
[14]% [14]% [14]% [14]% [15]%   |  [14]%  [15]%

832 — ○ Maximize impressions for each time of day
833 — ● Enter specific percentage of overall impressions for times of day above If availability is low for a selected daypart:

834 — Adhere exactly to my percentages. [=========]  Reach as many listeners as possible by increasing non-zero percentages.

[Save] [Cancel]

campaign objective. <u>Show Inventory Restriction Options.</u>    [Cancel] [Next]

610 — Name your campaign:
Audio Campaign #2
This name is for your use, to identify your campaigns. It may also be seen by radio stations. If this campaign is similar to one you have created previously, click here to copy those settings.

Primary campaign objective: —611
Identify the primary marketing objective for this campaign. We will use this information to taylor the
620 — settings of your campaign to make it most effective for achieving your goal.

| Brand building ▲ | Brand maintenance campaigns emphasize reaching as |
| Brand maintenance | many listeners as possible in the most cost effective |
| Time-sensitive promotion ▼ | manner. |

630 — Demographic target:
Describe the age and gender of your target audience below. We will use this information to identify the stations that will reach your target listeners most efficiently.

Gender: ☑ female ☑ male
Age range:
| 12-17 | 18-20 | 21-24 | 25-34 | 35-44 | 45-49 | 50-54 | 55-64 | 65+ |

Demographic data source: Arbitron, Jan, 2008

640 — Qualitative target:
Describe the social characteristics of your target audience below by describing the product being advertised or the audience itself. We will use this information to identify station types and markets that reach your intended audience most effectively.

643 — Primary:
Automotive
Beverage
Banking & Financial
Computer / Internet

646 — Secondary:
Home/Personal Computer
Own personal Digital Assistant (PDA)
Places or internet access past 30 days
Type of internet connection 649 — Tertiary:
Cable modem
Dial-up
DSL
Other connection Bid: 659
I am willing to pay up to $ [5.00] per thousand listeners (CPM)

Historic inventory cost: $2.50 -- $19.95
The historic inventory cost shows the range of winning CPMs required to reach your target listeners in the last seven days. The higher you bid, the more likely you are to win spots.

903 — Inventory Restrictions: None
▶ Station Formats
▼ Days of Week
  Date Range: [#1 ▼]
  Monday: 14%     Friday: 14%
  Tuesday: 14%    Saturday: 14%
  Wednesday: 14%  Sunday: 15%
  Thursday: 14%
  Reach as many listeners as possible
Times of Day

[Cancel] [Next]

1000

Campaign Scope:
Is your campaign suited for all areas of the US or is it only intended for a regional/local audience?

1010 — [ Entire US ▼ ]

Select Markets:
Is your campaign suited for all areas of the US or is it only intended for a regional/local audience?

Show [ Top 10 Markets ▼ ] ⎯ 1024

1022 —

[ Map | Markets ]

San Francisco
1021
San Diego
1023
New J
Delawa
District of Columbia

Expensive Market ▬▬▬▬▬▬▬▬▬▬▬▬▬▬▬▬▬▬▬▬ Inexpensive Market ⎯ 1025

| Market Name | State | Rank | Min Effective budget |
|---|---|---|---|
| Los Angeles | CA | 3 | $10,000 |
| Oklahoma City | OK | 1 | $3,000 |
| Somewhere | NO | 7 | $1,000 |

1027

[ Remove ]

$14,000 minimum effective weekly bedget [?]

To achieve your campaign objectives for the target audience in the markets you've selected, we suggest you spend no less than the minimum effective weekly budget.

FIG. 10

[ Back ] [ Next ]

Weekly Budget: ⎱ 1110

$ [14000]  per week

This is your minimum effective weekly budget that we suggest you spend to achieve your campaign objectives for the target audience in the markets you've selected. To spend less than this budget – not recommended – turn this setting off.

Dates:
Start Date [11/27/2008] ⎱ 1141
Manage Budget Over Time

[Get New Estimates]  ⎯⎱ 1142      ⎱ 1143

| | |
|---|---|
| Date ranges | 1 date range between 1/12/2008 and 2/6/2008 |
| Estimated avg. CPM | $1.37 |
| Estimated impressions* | 327,427 impressions per week, or 1,216,159 total |
| Estimated ad plays* | 185 ad plays on 14 stations(s) |
| Estimated cost | $14,000 per week, $56,000 per month, $728,000 per year |

[Back] [Next]

Weekly Budget: 1200

14000 — 1210

This is your minimum effective weekly budget that we suggest you spend to achieve your campaign... than th... o spend less

Budget Management

Dates: — 1220
- ● No end date
- ○ End date

Start Da... From 1/1/08 To 1/1/09

Manage...

☐ Flights — 1229

1. From 1/1/08 To 1/1/09 — 1241
2. From 2/1/09 To 3/1/09 — 1222

Get N... Add another flight

☑ Event-based bidding — 1230

Estim... Play ads where:
Targeted markets have ● Daily high
○ Daily low

Estimat... [above ▼] [____] °F — 1234

Esti... Add another event ▼ — 1231

000 per year total

[Save] [Cancel]

[Back] [Next]

Weekly Budget:

$ [14000] per week

This is your minimum effective weekly budget that we suggest you spend to achieve your campaign objectives for the target audience in the markets you've selected. To spend less than this budget – not recommended – turn this setting off.

Dates:
Start Date [11/27/2008]
Manage Budget Over Time

Edit Settings

▼ Event Settings

1360 — | 1. Play adds where targeted markets have a daily high above 80 degrees F.

1142 — [ Get New Estimates ]

| | |
|---|---|
| Date ranges | 1 date range between 1/12/2008 and 2/6/2008 |
| Estimated avg. CPM | $1.37 |
| Estimated impressions* | 327,427 impressions per week, or 1,216,159 total |
| Estimated ad plays* | 185 ad plays on 14 stations(s) |
| Estimated cost | $14,000 per week, $56,000 per month, $728,000 per year |

1143

[ Back ] [ Next ]

FIG. 13

ACHIEVING ADVERTISING CAMPAIGN GOALS

TECHNICAL FIELD

This disclosure generally relates to broadcast advertisements and systems for calculating campaign settings, budgets, and implementing advertising campaigns.

BACKGROUND

Advertisements can be included in various forms of broadcast media. For example, broadcast advertisements such as radio can be a powerful medium for advertisers to achieve their goals for a given advertising campaign. In order to create a successful broadcast advertising campaign, an advertiser generally needs two types of knowledge. First, the advertiser must understand his or her marketing objective—what he or she is trying to accomplish and within which audience. Second, the advertiser must understand how to manipulate campaign settings such as reach, frequency, locations, tier distribution, days, and dayparts, to achieve that objective. This second type of knowledge, however, may be prohibitively complex for certain advertisers, especially new advertisers, to fully comprehend.

SUMMARY

Among other things, techniques and systems are disclosed for achieving advertising campaign goals.

This specification describes various aspects relating to automated booking of broadcast advertising campaigns based on advertising goals. For example, automated booking can automatically calculate campaign settings based on one or more advertising goal. Automated booking also can automatically calculate a minimum effective budget for one or more markets based on the campaign settings. Automated booking can automatically display the one ore more markets on an interactive map-based advertiser interface and receive narrowing criteria to help focus the advertising campaign.

In one aspect, a computer-implemented method includes receiving an advertising goal for a broadcast advertising campaign; translating the advertising goal into one or more rules; and automatically calculating campaign settings based on the one or more rules.

In other implementations, the method of claim includes allocating advertising spots in a broadcast advertising market based on the calculated campaign settings. Further, the advertising goal includes one or more of brand maintenance, brand building, or a time sensitive promotion. Additionally, the advertising goal includes a marketing objective and a target audience.

In other implementations of the method, the calculated campaign settings include a target reach. Also, the calculated campaign settings include a target frequency. Additionally, the calculated campaign settings include a tier distribution. Additionally, the method includes calculating a minimum effective budget for one or more markets based on the calculated campaign settings. Also, the calculating the minimum effective budget is based on estimating a price of allocating advertisements to available inventory according to the campaign settings in order to achieve a target reach and a target frequency. Further, the method includes displaying each of the one or more markets and the minimum effective budget for each market on a map-based user interface.

In other implementations of the method, the translating the advertising goal is according to a predetermined allocation strategy. Also, the method further includes receiving feedback data regarding the success of the campaign; analyzing the feedback data; and optimizing the allocation strategy based on to the feedback data.

In another aspect, a computing device comprising a computer program product stored on a computer readable medium, the stored computer program product including executable instructions causing the computing device to perform functions including receiving an advertising goal for a broadcast advertising campaign; translating the advertising goal into one or more rules; and automatically calculating campaign settings based on the one or more rules.

In other implementations, the stored computer program product includes executable instructions causing the computing device to perform functions comprising allocating advertising spots in a broadcast advertising market based on the calculated campaign settings. Additionally, the advertising goal comprises one or more of brand maintenance, brand building, or a time sensitive promotion. Further, the advertising goal comprises a marketing objective and a target audience.

In other implementations of the stored computer product, the calculated campaign settings include a target reach. Also, the calculated campaign settings comprise a target frequency. Further, the calculated campaign settings include a tier distribution.

In other implementations, the stored computer program product further includes executable instructions causing the computing device to perform functions comprising calculating a minimum effective budget for one or more markets based on the calculated campaign settings. Also, the calculating the minimum effective budget is based on estimating a price of allocating advertisements to available inventory according to the campaign settings in order to achieve a target reach and a target frequency. Additionally, the stored computer program product includes executable instructions causing the computing device to perform functions comprising displaying each of the one or more markets and the minimum effective budget for each market on a map-based user interface.

In other implementations of the stored computer product, the translating the advertising goal is according to a predetermined allocation strategy. The stored computer program product further includes executable instructions causing the computing device to perform functions comprising: receiving feedback data regarding the success of the campaign; analyzing the feedback data; and optimizing the allocation strategy based on to the feedback data.

In another aspect, a system includes an advertiser-facing module configured to interface with an advertiser; a calculation module configured to receive an advertising goal for a broadcast advertising campaign; a means for translating the advertising goal into one or more rules; a means for automating calculation of the campaign settings based on the one or more rules; an add-booking module configured to allocate advertisements based on the calculated campaign settings to advertising slots in the selected markets; and a broadcaster-facing module configured to interface with a broadcaster that broadcasts the advertisements.

The general and specific aspects can be implemented using a system, method, or a computer program, or any combination of systems, methods, and computer programs. The details of one or more implementations are set forth in the accompanying drawings and the description below. Other features, aspects, and advantages will be apparent from the description, the drawings, and the claims.

DESCRIPTION OF DRAWINGS

These and other aspects will now be described in detail with reference to the following drawings.

FIGS. 6-13 show sample advertiser interfaces for booking an advertising campaign.

Like reference symbols in the various drawings indicate like elements.

DETAILED DESCRIPTION

Figure 1:
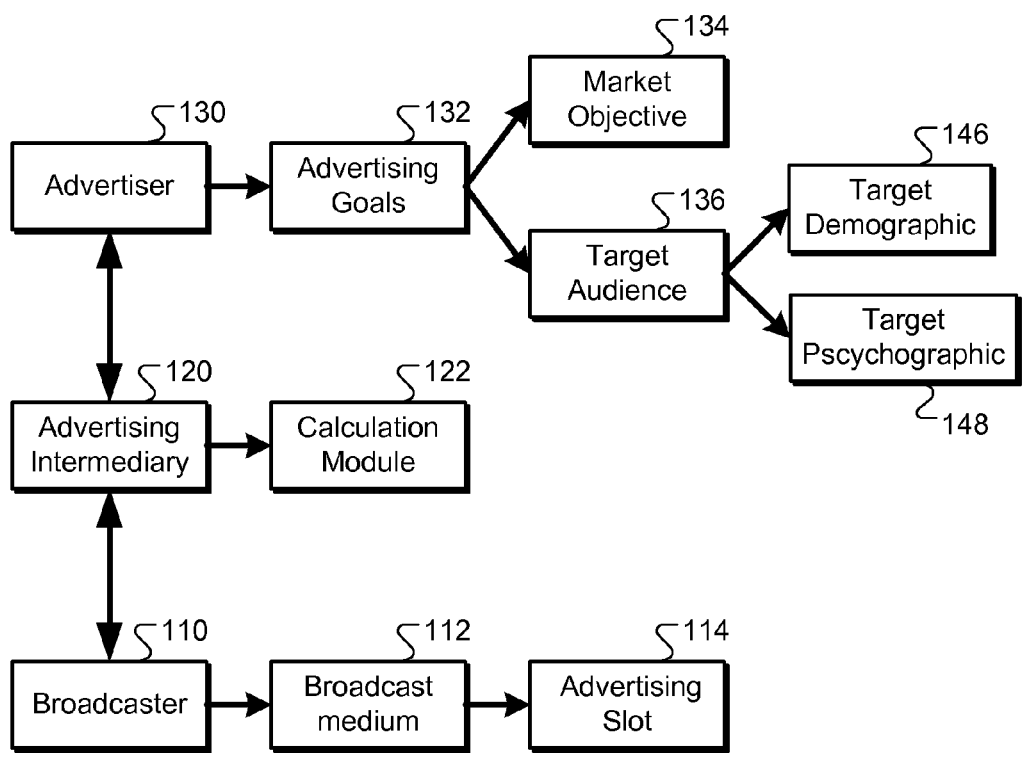
FIG. 1 shows relationships between various advertising components.

FIG. 1 is a conceptual diagram of an advertising campaign showing relationships between various advertising components. FIG. 1 shows an advertiser 130, an advertising intermediary 120, and a broadcaster 110. The advertising intermediary 120 interfaces with the advertiser to receive advertising goals 132. The advertising intermediary 120 also is communicatively coupled to the broadcaster 110 to book or manage available advertising spots 114 for advertising campaigns.

The advertiser 130 can include, e.g., an online advertiser, a direct sales advertiser, an advertising agency, or any user using the advertising intermediary to manipulate an advertising campaign. An advertiser 130 who is interested in increasing revenue by launching a broadcast advertising campaign chooses advertising goals 132, such as a marketing objective 134 and a target audience 136. The marketing objective 134, for example, can include brand building, brand maintenance, or a time sensitive promotion. Other marketing objectives include, for example, increasing call volume, increasing website traffic, increasing search volume, driving in store traffic, decreasing cost per customer acquisition, acquiring new customers, etc. Depending on the type of campaign, brand maintenance emphasizes reaching as many potential customers as possible in order to maintain awareness of the advertiser or the advertiser's product. Brand building focuses on building a brand such as a new product. For example, a brand building campaign focuses on a relatively higher frequency with less emphasis on reach and with more advertisements allocated on higher rank stations. The time sensitive promotion emphasizes advertising based on specific timeline, e.g., for a specific promotion, holiday, or event. For the time sensitive promotion, the advertiser also designates a secondary objective which includes yet another campaign objective.

The target audience 136 can include, for example, a target demographic 146 or a target psychographic 148. The target demographic 146 can be based on, for example, gender or age. The target psychographic 148 can include attributes relating to personality, values, attitudes, interests, lifestyles or behaviors. For example, an advertiser may want to target an audience that has a particular interest in sports, that uses a particular type of technology, or that consumes a particular type of product.

FIG. 1 shows a broadcaster 110, a person or entity who distributes media content, which includes, for example, a terrestrial radio station, a satellite radio station, a television station, a podcaster, a cellular broadcaster, or an internet broadcaster. The broadcaster 110 can deliver broadcast content to the audience via broadcast medium 112, which can include, e.g., radio, television, or the Internet, or any digital broadcast medium. Additionally, various advertising spots, such as advertising slot 114, can be included as part of the broadcast content. The advertising spots are, e.g., time slots when ads can play during a broadcast. For example, advertising spot 114 can be a 30-second time slot of the broadcast content.

The advertising intermediary 120 calculates campaign settings based on advertising goals 132. Campaign settings include allocation targets for a campaign such as target frequency, target reach, tier distribution, bid buying or reserve buying, day of week, time of day, geographic target, ad length, station type etc. Campaign settings can include various methods of segmenting an advertising market. The calculation module 213 calculates the campaign settings according to a preset allocation strategy.

Based on the campaign settings, the advertising intermediary then calculates and returns a minimum effective budget for one or more markets. For example, the budget can be returned as a minimum effective weekly budget. The minimum effective weekly budget is an estimate of the minimum amount of money that must be spent per week to obtain an appropriate number of spots based on the calculated campaign settings and therefore achieve the target reach and target frequency. For a bid based campaign for example, the minimum effective budget is the estimated budget that will produce a campaign that performs in such a way that is consistent with the advertiser's goal and the advertisers bid, so long as market inventory conditions and rates remain constant over time.

In radio advertising for example, "reach" estimates the number of unique listeners who hear an ad at least once during a given schedule; and "frequency" estimates the average number of times each listener hears the ad during a given time period. Reach and frequency are campaign metrics and can be used to measure the effectiveness of an advertising campaign. Target reach is the target number of unique listeners for an advertising campaign. Target frequency is target number of times each listener will hear an ad during a given time period. Tier distribution is the target distribution of ads amongst broadcasters within a particular market for a campaign. Cost per mille (CPM) metric represents cost per thousand impressions of an advertising campaign or an ad message in a given medium.

Additionally, the advertising intermediary 120 books advertising slots 114 according to the campaign settings with the broadcasters 110 and provides payment to the broadcaster 110 for playing advertisements during the advertising slot 114. The advertising intermediary 120 allows the broadcasters (e.g., radio stations) to supplement their existing revenue streams by making their advertising inventory available to advertisers and particularly to new advertisers that may not be easily accessible to the broadcasters.

Figure 2:
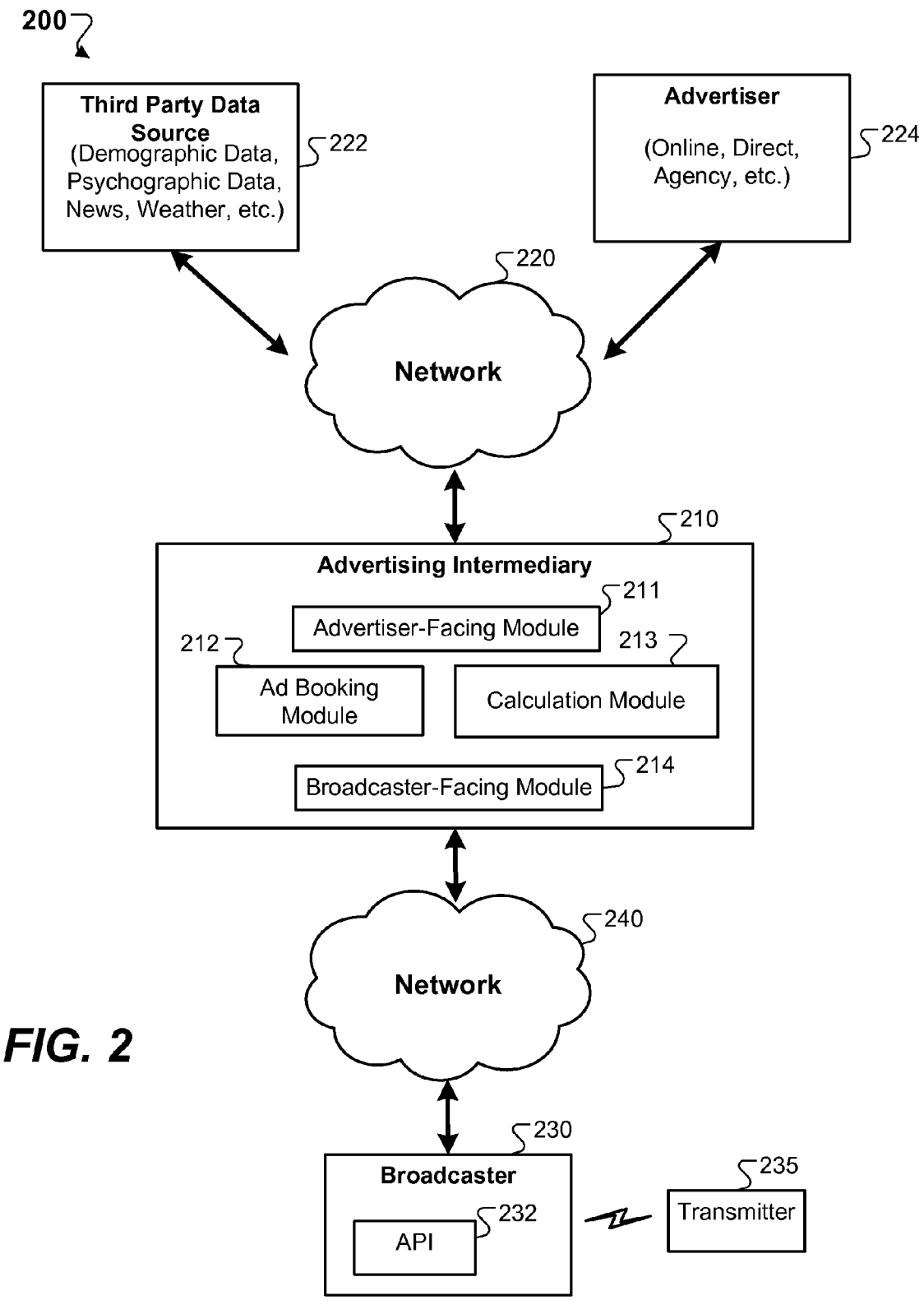
FIG. 2 is a schematic diagram of a system for booking an advertising campaign.

FIG. 2 is a schematic diagram of a system 200 for booking an advertising campaign. The methods, processes, engines, apparatus, computer program products, systems and the like discussed below can be applicable to an audio advertising environment and other communication environments including broadcast television, cable television, satellite television, Internet communication systems (including Internet radio and Internet TV), and other communication environments.

System 200 includes an ad inventory management system (IMS) 210, which can include an advertiser-facing module 211, an ad booking module 212, a calculation module 213, and a broadcaster-facing module 214. The advertiser-facing module 211 can interface with and communicatively couple to third party data source 222 and to advertiser 224 via a network 220. In one example, the advertiser facing module can be a business-logic tier. The inventory management module includes one or more data processing apparatuses. In various implementations, the network 220 can include any network, such as a local area network, metropolitan area network, wide area network, a wired or wireless network, a private network, or a virtual private network. In this example, the network 220 is the Internet.

The third party data source 222 can include any database, data mart, or other data source that provides data of interest to the advertiser 224 or relevant to the scheduling of advertisements. For example, third-party data source can be Arbitron Inc., which provides ratings and demographic breakdowns for each station or broadcaster in a broadcast market. Psychographic data can be provided by, for example, Scarborough Research. Psychographic data can include market data for a particular product or can include data such as shopping patterns, lifestyles and media habits of consumers locally, regionally and nationally. In addition, third-party data can be the weather forecast, current weather conditions, or news events such as stock prices, sports scores, data from a syndicated data feed such as an RSS feed, or any other data relevant to the advertising campaign.

Rank can be calculated by the inventory management system using the data from the third party data source(s) 222. In one example, rank is a function of a station's target listeners (demographic or psychographic) in relation to the size of a given market. In the case of demographic ranking, for example, rank is calculated based on the third party data such as the number of target listeners and market population. In another example, rank can be obtained directly from a third-party data source.

The advertiser provides advertising goals such as target audience and a marketing objective to the IMS 210 via network 220. For example, the advertiser 224 can use a advertiser interface application such as a web-based application on a data processing apparatus that provides data through network 220 via an internet connection to the advertiser facing module 211. The internet connection can include, e.g., a TCP/IP protocol using a conventional dial-up connection over a modem, or a dedicated connection that provides constant access (e.g., a cable modem or a DSL connection). The advertiser-facing module 211 can have a unique HTTP address, a unique FTP address, or any other addressing scheme that allows advertiser 224 to identify the advertiser-facing module 211. In one implementation, advertiser 224 can have an account and be charged a fee for use of the IMS 210. In another implementation, advertiser 224 can use the IMS 210 free of charge.

The calculation module 213 determines which advertisements to allocate to which slots based on the advertising goals provided by the advertiser. For example, the calculation module uses the information from the third party data source 222 to generate a list of broadcasters that can provide access to the target audience. The calculation module also obtains or calculates market based rankings for the broadcasters. Based on the advertising goals provided by the advertiser 224, the calculation module calculates campaign settings for the advertising campaign. The calculation module uses the campaign settings and the rankings of the broadcasters to calculate the minimum effective budget needed for each market to achieve the advertising goals. The advertiser-facing module provides to the advertiser the minimum effective budget for each of the markets. The advertiser-facing module 211 then receives from the advertiser 224 a selection of target markets for the advertising campaign.

The broadcaster-facing module 214 can interface via network 240 with broadcaster 230, which can be, e.g., a radio station. In one implementation, network 240 can be a network the same as or similar to network 220. The broadcaster 230 can deliver broadcast content to the audience via e.g. transmitter 235. The broadcaster 230 can include an application programming interface (API) 232 that communicates with the inventory management system 210.

The ad booking module 212 is used by the IMS 210 to book an advertising campaign for the advertiser 224. The ad booking module 212 can allocate advertising spots in the selected markets that sufficiently match the campaign settings for the advertising campaign. The IMS 210 can provide auction based booking where advertising slots are purchased by bidding for them or reserve based booking of advertisements where advertisements are purchased for a specific time frame at market price. In one implementation, the IMS 210 provides, real-time matching of advertisements with available advertising slots from the broadcasters. In addition, the IMS 210 can offer air-ready advertisements automatically and allows broadcasters to review advertisements before they air. Furthermore, by integrating directly with broadcasters' automation systems, the advertising intermediary can allow advertisements purchased by advertisers through the IMS 210, to be placed directly into the broadcasters' broadcasts.

Figure 3A:
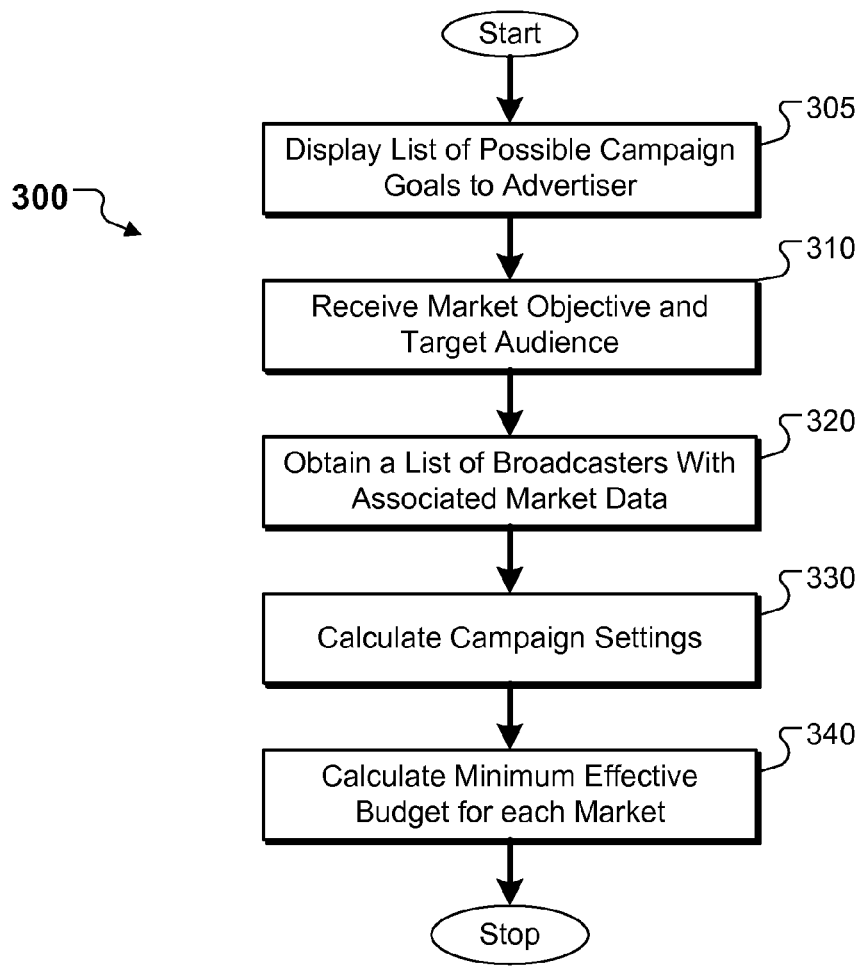
FIG. 3a-3b are flow charts illustrating processes for automated calculation of campaign settings and minimum effective budgets for an advertising campaign in one or more markets.

FIG. 3a is a flow chart illustrating a process 300 automated calculation of campaign settings and minimum effective budget for an advertising campaign in one or more markets. At 305, possible advertising goals are displayed to an advertiser, for example, as a number of text strings that have an understood meaning to the advertiser in terms of what the advertiser is trying to accomplish. At 310, process 300 receives the selected advertising goals including a marketing objective and a target audience from the advertiser.

At 320, process 300 obtains a list of broadcasters with associated market data. Obtaining a list of broadcasters can include using a third-party data source that provides information on broadcasters in various advertising markets such as Metro Survey Area (MSA) or Designated/Demographic Market Area (DMA). The associated market data includes, for example, market statistics, consumer media information, price data, broadcaster program data, audience statistics, ratings, rankings, demographic data, psychographic data, product data etc. In another implementation, the list of broadcasters and associated market data can already be stored in the IMS. In yet another implementation, the process can use the associated market data to rank the broadcasters. Or, the process 300 can retrieve rankings of the broadcasters in each market directly the third party data source. One type of ranking is demographic ranking which is based on the target audience. In such a ranking, the higher ranked broadcasters have a higher percentage of the target demographic. The process 300 can also determine the cost effectiveness of each broadcaster and each slot based on the price data. The process can rank the stations based on the cost effectiveness.

At 330, process 300 calculates campaign settings based on the advertising goals. The process translates each goal into a series of rules for calculating settings for an advertising campaign that will produce results consistent with the understood meaning of the selected text string. The calculation of the rules is based on a predetermined allocation strategy. And, the settings dictate how the campaign will allocate advertisements in each market.

For example, process 300 at 330 can calculate a tier distribution. For example, depending on the advertising goal, the process 300 can determine that a high tier distribution for the campaign is appropriate. The advertising intermediary will, therefore, determine that advertisements will be allocated to top-ranked broadcasters in a market first. For other advertising goals, the process 300 can determine that a low tier distribution is appropriate. For a low tier distribution, the process 300 determines that advertisements will be allocated to low-ranked broadcasters in a market first. A different percentage of advertisements can be allocated to each tier depending on the advertising goals. Similarly, the process 300 can vary other campaign settings by tier in order to best achieve the advertising goals. For example, reach and frequencies can be set differently for different ranks or groupings of ranks. In one such example, the process can set a low target frequency on top-ranked stations and high target frequency on low-ranked stations in a manner consistent with the advertising goal. In other examples, tier distribution is set to allocate only to particular broadcasters and not to others. In yet another example, advertisements can be set to play at different times of day for high, medium, and low tiers. In another example, particular programs can be targeted for different stations.

In another example, the process receives from an advertiser of a brand that is well-established among a particular demographic and psychographic a selection of a brand maintenance market objective that targets the particular demographic and psychographic. The advertiser is interested in maintaining awareness amongst the particular target demographic and target psychographic. As a result, the system calculates campaign settings that focus on increasing reach at the best price. For this campaign, the process sets a high target reach, low target frequency, and low tier distribution. In many cases, the higher ranked broadcasters demand a premium for advertising slots. As a result, the process sets a tier distribution to allocate a lower percentage of advertisements among high ranked tiers and a higher percentage of advertisements among lower ranked tiers of broadcasters. The process also calculates campaign settings to decrease frequency. In some situations, the lower tier broadcasters is not optimal for achieving the target reach and frequency amongst the target demographic and psychographic; in one such example, although allocating advertisements on the lower tier broadcasters is cheaper than the higher tier broadcasters per advertisement, the campaign may require such a high volume of advertisements among low tier broadcasters to achieve the reach and frequency goals that allocating advertisements to low tier broadcasters may not be cost effective. In such a case, the process calculates campaign settings that focus on the middle tier stations that are not too expensive but provide access to the target audience.

In another example, the process receives from an advertiser seeking to establish a new brand amongst a particular psychographic and demographic a selection of a brand building market objective. This can be, for example, a new movie geared to teenage boys. The advertiser is interested in building awareness of the new brand. In such a campaign, the process sets a high target frequency and a low target reach and a high tier distribution i.e. more allocations on higher rank stations. In many cases, the higher ranked broadcasters demand a premium for advertising slots such that it is too expensive to allocate enough the advertisements on the higher tier stations to achieve the target reach and frequency amongst the target audience. In this case, the process calculates the most effective tier distribution amongst the higher and medium tiers to achieve the target reach and frequency amongst the target audience while maintaining the cost effectiveness of the campaign.

In another example, process can determine that a particular station or program should receive a higher percentage of allocations even though such a strategy is not the most efficient in order to reach the target reach and target frequency. This is particularly true, for example, if one of the campaign objectives is brand association which can include brand association with a particular station or program.

At 340, process 300 uses the campaign settings and the rankings of the various broadcasters to calculate a minimum effective budget for each market. Campaign settings that segment the market, such as tier distribution, day, time of day, and station type, limit the inventory available for the campaign to target in each market and direct what inventory receives priority when allocating advertising spots. The process 300 at 340 estimates how much of this inventory must be targeted to achieve the target reach and target frequency. The process then uses price data to determine the estimated cost of targeting this targeted inventory. In one example, the process simulates based on the market data allocating advertisements in each individual market according the campaign settings that segment the market until the target reach and target frequency are achieved.

In a bid based buying campaign, the minimum effective weekly budget is the approximate amount of money that should be spent per week to win the targeted inventory and to win enough of the targeted inventory to achieve the advertising goals. If the campaign is set to bid based buying, the minimum effective budget will be based on historic bids for advertising spots of the various broadcasters in the list generated at 320. If the campaign is set to reserve buying, the minimum effective budget will be calculated using market rates for the particular time frame set by the advertiser for the time sensitive promotion. In this manner, the advertising booking system automates the complex task of determining the questions of: "How many potential customers to talk to?"; "How often to ask them for their business?"; and "Which broadcaster can reach the target audience at the most effective price?"

Figure 3B:
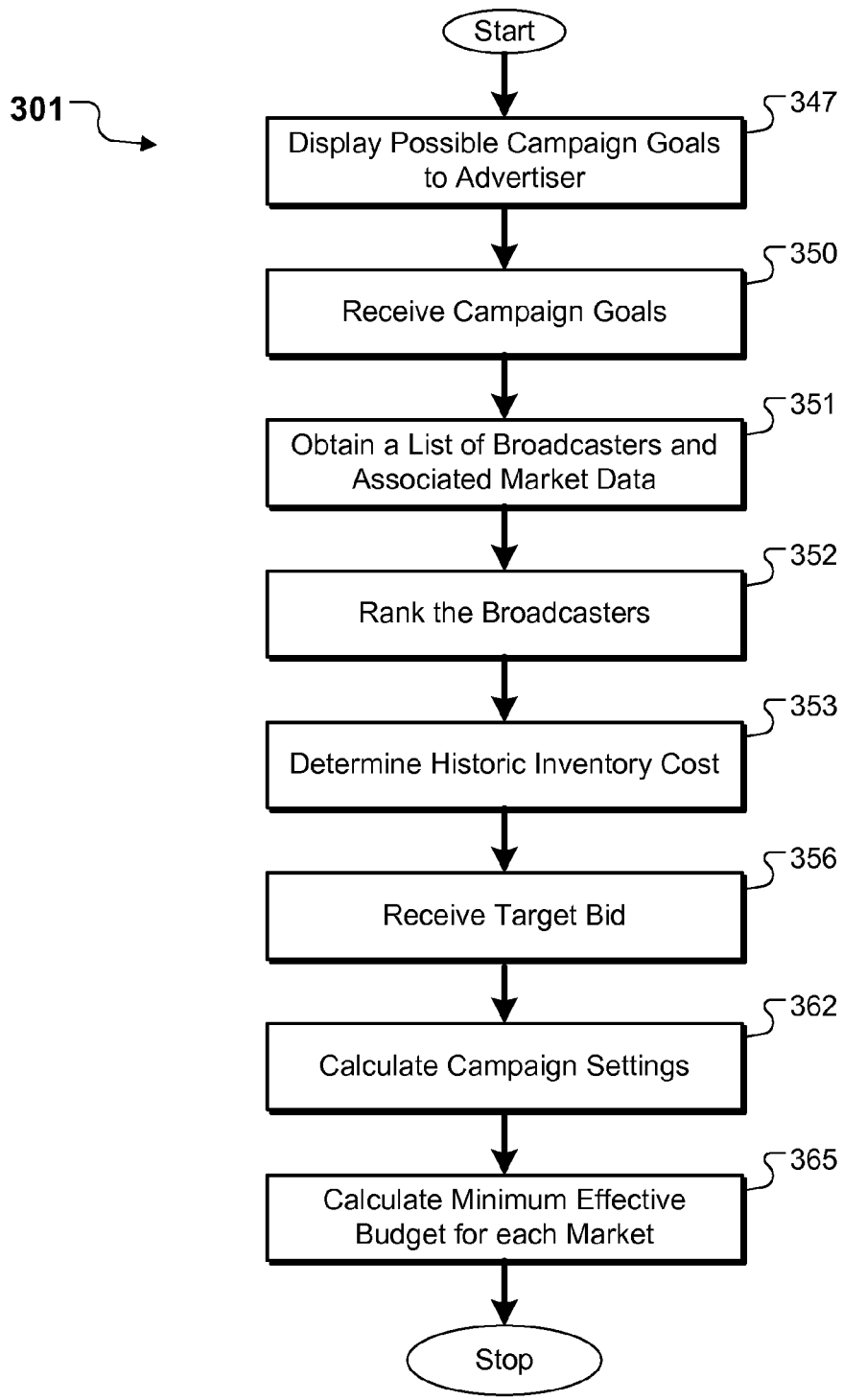

FIG. 3b is a flow chart illustrating a process 301 for automated calculation of campaign settings and a minimum effective budget for an advertising campaign in one or more markets for a bid based campaign. At 347, the process displays possible advertising goals to the advertiser, and at 350 receives a selection of advertising goals from the advertiser. At 351, the process 351 obtains a list of broadcasters with associated market data. At 352, the process 301 ranks the broadcasters based on the associated market data. The type of rankings the process 301 performs depends on the advertising goals. For example, the process 301 will rank based on demographics and/or psychographics if one of the advertising goals is a target audience.

At 353, the process 301 determines a historic inventory cost, for example CPM. The process 350 estimates the range of winning bids based on the price data. The estimate can be based on a specific time period, for example, for the past week. The historic inventory can be based on an average across all broadcasters or can be based on an average for the broadcasters that can best reach the target audience. At 356, the process receives a maximum bid the advertiser is willing to spend on the advertising campaign.

At 362, the process calculates the campaign settings. The process 301 can use the same or similar process as that explained above in connection with FIG. 3a except that the bid is factored into calculating the campaign settings. The maximum bid effects how advertisements will be allocated in the campaign. For example, depending on the maximum bid, the price of some advertising slots for some broadcasters can be too high for the maximum bid and can limit the inventory available in certain tiers or at certain times. As a result, the tier distribution can be skewed from what it otherwise would be in order to achieve the other campaign settings such as target reach and target frequency. In another example, a relatively high bid can allow the process to set more aggressive tier distributions or more aggressive the target reach and target frequencies in order to achieve the advertising goals. In yet another example, maximum bid effects how the process sets time of day or which programs on a station will be targeted.

At 365, the process 301 calculates the minimum effective budget for one or more markets. The process 301 determines the most efficient slots that matches the advertisers campaign settings. The process 301 also calculates how many of those slots are needed to achieve the target reach and frequency. Based on this information, the process 301 can calculate the minimum effective budget.

Figure 4:
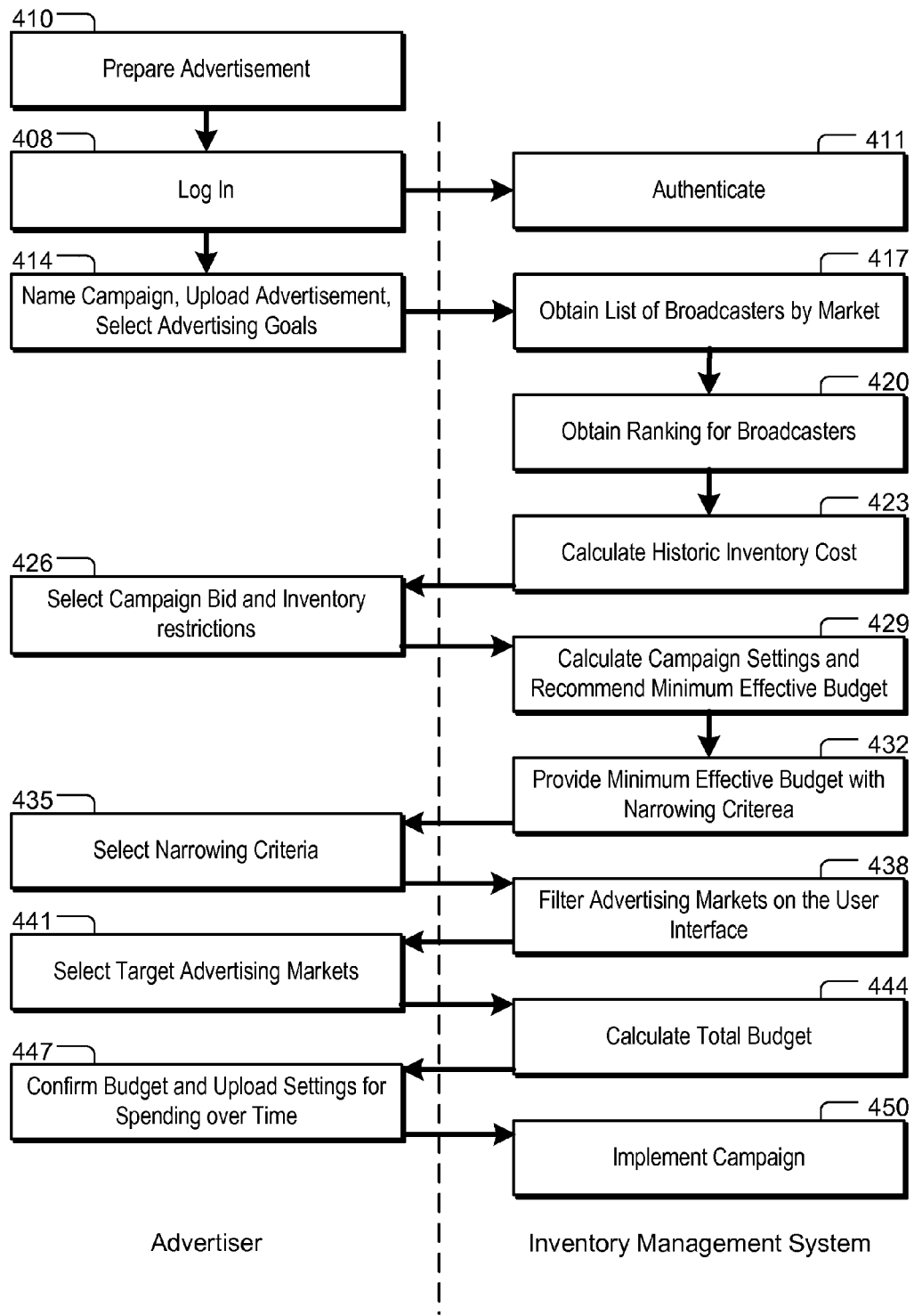
FIG. 4 is a flow chart illustrating data flow between an advertiser and an inventory management system when booking an advertising campaign.

FIG. 4 is a flow chart illustrating data flow between an advertiser and an inventory management system when booking an advertising campaign. At 410, the advertisement is prepared. The advertisement can be produced by the advertiser directly or can be produced by, e.g., a radio production professional. At 408, the advertiser logs into to the IMS. At 411, the IMS authenticates the log in. At 414, the advertiser names the campaign, uploads the advertisement, and selects the advertising goals, such as the marketing objective and the target audience. At 417, the IMS obtains a list of broadcasters grouped by market with associated market data. In another implementation, the list is already stored by the IMS. At 420, the IMS obtains rankings for the broadcasters. The IMS can obtain the rankings from a third-party data source or can rank the markets by itself. At 423 the IMS calculates the historic inventory cost.

The IMS estimates the range of winning bids based on the price data. The IMS calculates and displays a historic inventory cost—the historic range for winning CPMs for like campaign settings—to help guide the advertiser in making a bid. The advertiser then provides a bid for, e.g., thousand listeners (CPM) to the IMS. In another example, the advertiser enters a single bid that the IMS interprets as a maximum average for all advertising markets in the campaign. In yet another example, the advertiser enters separate bids for each market in the campaign.

At 426 the advertiser selects or inputs a campaign bid and inventory restrictions. This campaign bid is the maximum bid that the IMS will use when calculating the campaign settings and when allocating advertisements. The inventory restrictions will be described in more detail in connection with FIG. 8. At 429, the IMS calculates campaign settings and calculates a minimum effective budget for one ore more markets.

At 432, the IMS provides the minimum effective budget for each market to the advertiser. The markets can be displayed on a map-based advertiser interface with their respective minimum effective budgets. In another example, the markets can be displayed as a list or table with the respective minimum effective budgets for each market. Depending on the campaign settings and maximum bid, some markets might not have the sufficient inventory to achieve the campaign settings or inventory is priced above the maximum bid. In such a case, the IMS can indicate that those markets are unavailable the on the display or omit those markets from the display.

At 432, the IMS also presents the advertiser with various narrowing criteria such as geographic scope, demographic rank, psychographic rank, or price. At 550, the advertiser selects one or more narrowing criteria. At 438, the IMS filters the advertising markets based on the narrowing criteria. The IMS displays the markets that best match the narrowing criteria with their respective minimum effective budgets on the map-based advertiser interface.

In one example, the advertiser wants to market the advertised product in particular regions, states, or markets. So, the advertiser would select narrowing criteria that match the geographic scope of the target advertising campaign. Or in another example, the advertiser may wants to only advertise in the top markets for the particular demographic or psychographic. For example, if the advertiser is targeting people who are interested in sports, one of the narrowing criteria could be the top three markets for people who have consumed sports media in last 30 days. Once the advertiser selects the narrowing criteria, the IMS filters the markets and displays only those that match this narrowing criteria. In another example, the advertiser wants to minimize costs. To do so, the advertiser would select narrowing criteria based on the lowest minimum effective budgets. The IMS displays the markets that have minimum effective budgets that match this narrowing criteria. In this manner, the map-based advertiser interface provides a feedback mechanism for the advertiser that aids in tailoring where the advertiser should advertise and how much the advertising campaign will cost.

At 441, the advertiser selects the target advertising markets for the campaign. At 444, the IMS calculates the total minimum effective budget for all of the selected markets. The total minimum effective budget is the budget necessary to achieve the advertising goals for all of the target advertising markets. In general, the budget is calculated as a weekly budget. The IMS confirms the budget with the advertiser. At this point, the advertiser selects the minimum effective budget or can override the minimum effect budget by increasing or decreasing the budget for the campaign.

At 447, the advertiser then can finalize the remaining settings. For example, the IMS also calculates a set of budget management settings such as end date, start date, flight based bidding, event based bidding, target days, target dayparts, target markets. The advertiser can change these settings, as will be discussed in more detail below.

Once the settings are all finalized, the IMS implements the campaign at 450. The IMS then bids on advertising slots in the selected markets according on the campaign settings, the maximum bid, and the minimum effective budget.

Figure 5:
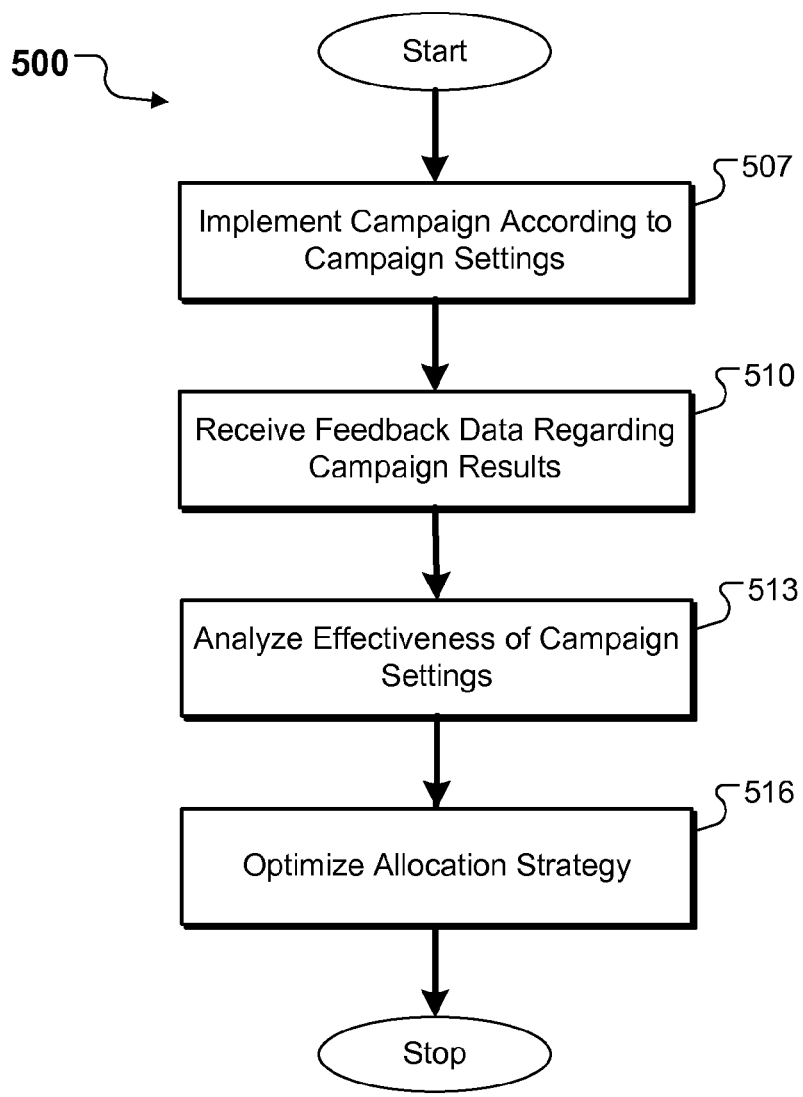
FIG. 5 is a flow chart illustrating a process for optimizing an allocation strategy for calculating campaign settings.

FIG. 5 is a flow chart illustrating a process 500 for optimizing an allocation strategy for calculating campaign settings. At 507, the process implements a campaign according to a set of campaign settings calculated according to an allocation strategy by the IMS based on advertising goals. The process 500 receives feedback data regarding campaign results. This feedback data can come directly from the advertiser or from another source. This data can also be returned to the IMS real-time. The feedback data includes data that indicates the success of the campaign. In one example, an advertiser has a goal to increase call volume. The advertiser feeds back the call volume. Other examples of feedback data include website traffic, search trends, analytics data, conversion data, customer acquisition data, etc.

At 513, the process analyzes the effectiveness of the campaign settings based on the feedback data. The analysis can also include determining from the feedback data the effectiveness of the campaign. Or, the analysis can include comparing the feedback data with feedback data of various campaigns with similar settings. The analysis can also include comparing the feedback data of different iterations of a campaign with slightly altered settings. At 516, the process 500 optimizes the allocation strategy. The allocation strategy is the allocation strategy the IMS uses in calculating the campaign settings based on the advertising goals. Each time a campaign is run the campaign settings can be optimized. Over time the effectiveness of the allocation strategy increases.

The process 500 for optimizing the allocation strategy can be used to increase the effectiveness over time of a single campaign or of a single advertiser's campaigns. Also, the lessons learned from a single campaign of from a single advertiser can then be applied to other advertisers' campaigns. For example, a given advertiser chooses a advertising goal such as "increasing calls to my 800 number goal". The process 500 optimizes the allocation strategy for this campaign. That same allocation strategy is then used as a starting strategy for other "increase calls to my 800 number" campaigns, e.g. for other advertisers. That same allocation strategy can also be used as a starting strategy for other generic call-to-action campaigns.

FIGS. 6-13 show sample advertiser interfaces for booking an advertising campaign. In FIG. 6 the advertiser selects advertising goals. At 610, the advertiser names the advertising campaign. If the advertiser has created a campaign using the IMS in the past, the advertiser can copy the selections from that previous campaign at 611. At 620, the advertiser selects the marketing objective, which can include brand building, brand maintenance, or a time-sensitive promotion. At 630, the advertiser selects the target demographic—gender and age range.

At 640, the advertiser selects the target psychographic, which can be based on multiple criteria. For example, the advertiser is allowed to select a primary criterion at 643 that describes the product being advertised or describes the audience itself. In this example, the advertiser selects "computer/internet." To help focus the psychographic target, the advertiser-facing module allows the advertiser to select a secondary criterion at 646. In this example, the advertiser is presented with four different computer/internet related criteria. The advertiser selects "type of internet connection." To help focus the psychographic target even more, the advertiser-facing module allows the advertiser to select a tertiary criterion at 649 such as thy type of internet connection. This qualitative target can also have a fourth and fifth etc. levels of focusing the target audience.

The advertiser also inputs a bid at 659. The advertising intermediary can use this bid in calculating the minimum effective budget and/or when implementing the campaign. The bid can be interpreted, e.g., as either the maximum allowed bid or an average bid that the system must maintain. In the later scenario, the system can bid above the entered CPM for one or more slots in a campaign so long as it bids lower on other slots to preserve the average. At 661, the historic inventory cost is displayed to the advertiser to help guide the advertiser in inputting the bid. At 664, the advertiser can select "Show Inventory Restriction Options." Selecting this option takes the advertiser to another advertiser-interface screen described in more detail in connection with FIG. 8.

Figure 7:
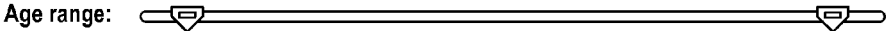

In FIG. 7, the advertiser selects a time-sensitive promotion at 620. The advertiser-facing module prompts the advertiser to select a secondary objective such as brand building, brand maintenance or a call to action at 622. As in FIG. 6 the advertiser selects the target audience such as demographic target, psychographic target, and is given the option to select the inventory restrictions option.

In FIG. 8 the advertiser is given the option to input inventory restrictions to narrow the scope of the campaign. Inventory restrictions allow the advertiser include or exclude inventory. If the advertiser does not input the inventory restrictions, the IMS includes inventory restrictions in the calculation of the campaign settings. In one example, the IMS automatically inputs the inventory restrictions after calculating the campaign settings and the advertiser can choose to override the inventory restrictions. In another example, the advertiser inputs inventory restriction and the IMS calculates the campaign settings within those restrictions.

At 807 the advertiser can choose to restrict inventory by station format. The advertiser is given a list of stations an can choose to include or exclude certain station formats. At 811 the advertiser can choose to restrict inventory by days of week. If the advertiser wants the campaign to maximize impressions for each day, the advertiser can select 812. In the example shown, 813 has been selected. By selecting 813, the advertiser can input a percentage of overall impressions for each day of the week. For example by placing 14% of the inventory on each of the weekdays and 15% of the inventory on Saturday and Sunday. At 814, the use can select how strictly the IMS will adhere to these settings when allocating advertisements. At the strictest, the advertiser can have the IMS adhere exactly to the selected percentages or on the other hand reach as many listeners as possible by increasing the non-zero percentages on the other days of the week. Or, the advertiser can select somewhere between these two extremes on a sliding scale.

At 820 the advertiser can choose to restrict inventory by times of day by directing what percentage of the daily inventory will be allocated to what time period. If the advertiser wants the campaign to maximize impressions for each time of day, the advertiser can select 832. In the example shown, 833 has been selected. By selecting 833, the advertiser can then input a percentage of overall impressions for each time of day. At 834, the use can select how strictly the IMS will adhere to these settings when allocating advertisements. At the strictest, the advertiser can have the IMS adhere exactly to the selected percentages or on the other hand reach as many listeners as possible by increasing the non-zero percentages on the other times of days. Or, the advertiser can select somewhere between these two extremes on a sliding scale.

FIG. 9 shows the advertisers selected advertising goals and bid. Also, the advertisers selected inventory restrictions are displayed at 903. After the advertiser selects next at 905, the IMS calculates the minimum effective budget.

Turning to FIG. 10, once the calculation module of the IMS calculates the campaign settings and the minimum effective budget for one or more markets, the advertiser-facing module displays the minimum effective budget on a map-based advertiser interface 1000 in connection with each of the markets. The map-based advertiser interface 1000 displays each of the markets on a map 1022. For example, the Los Angeles market is depicted by the colored region 1021.

Also, the map-based advertiser interface 1000 can indicate various market rankings, and/or market data such as demographic rank, psychographic rank, price, or minimum effective budget. In this example, the minimum effective budget for each market is indicated by color. Color code index 1025 shows how the markets are ranked by price with the red colors indicating markets with high minimum effective budgets and green colors indicating less expensive markets. The markets on the map are color coded to the color code index to indicate how high or low the minimum effective budget is for each individual market.

The map-based advertiser interface 1000 is also configured to allow the advertiser to select narrowing criteria. Once the advertiser has selected narrowing criteria, the IMS filters the markets and displays those markets that best match the narrowing criteria. At 1024, for example, the advertiser selects the top ten markets from among various narrowing criteria (not shown) in a drop down menu. These markets are the top ten markets for the advertiser's target audience. The IMS narrows the markets and displays the top ten markets in their color form while displaying the filtered markets in gray. At 1010, the advertiser can narrow the markets based on a geographic scope. For example, the advertiser can select based on region, state or locality. The IMS focuses the map to display only those markets within selected geographic scope. In this example, the advertiser selects the entire United States. In another example, the advertiser can select the geographic region prior to the IMS displaying the map-based advertiser interface 1000.

In another example, the map-based advertiser interface will display an information-balloon as advertiser clicks on a market. The information-balloon displays information related to that particular market such as the market name, state, minimum effective budget, rankings etc. The balloon can also have a button for selecting that market for the campaign or for closing the window. Once a market is selected, it is displayed in table 1027 with the respective minimum effective budget and ranking. A star 1023 is displayed on the map to indicate that the market has been selected for the campaign.

In FIG. 11, the advertiser-facing module displays the total minimum effective budget for all of the selected markets at 1110. If the campaign is set to auction based buying, the advertiser is presented with the minimum effective budget such as a weekly budget as seen at 910. If the campaign is a time-sensitive promotion, box 1110 indicates the total budget necessary to run the advertisements in the time frame set for the campaign.

Table 1143 displays estimates for the campaign such as the estimated date ranges for the campaign, estimated average CPM, the estimated number of impressions, estimated number of advertisement plays, and estimated cost. If the advertiser changes any of the settings such as weekly budget 1110, the advertiser can get new estimates for the campaign at 1142.

The advertiser can alter the settings for managing the budget; by clicking on 1141, a budget management window 1200 pops-up as seen in FIG. 12. In FIG. 12 at 1210, the advertiser can define the beginning and end date for the campaign. The advertiser can add flights at 1220 and add event based bidding at 1230 for the campaign.

For a flight, the advertiser defines when within the campaign to bid on advertising spots. For example, the advertiser sets a flight time frame within the campaign time frame at 1222. If the advertiser wishes to alter the flight settings, the advertiser can select "Inventory Restriction Options" at 1241. Selecting 1241 takes the advertiser to a screen the same or similar to that as depicting in FIG. 8. As described in connection with FIG. 8, the advertiser can define which days, which dayparts, and in which markets to bid during the flight. At 1229 the advertiser can add another flight for the campaign. For example, the advertiser can have the campaign set to bid for advertising spots differently during different time periods.

To add event based bidding, the advertiser clicks on the box at 1230. For event based bidding, the advertiser selects particular events that will trigger bidding at 1231. The IMS can monitor third-party data sources to determine when the selected event is occurring. For example, an advertiser selling air conditioning units may wish to advertise only when it is hot outside. In such an example, the advertiser can choose event based bidding and only advertise when the temperature is above, e.g., 80 degrees Fahrenheit. To do so, the advertiser inputs such criteria that will trigger bidding at 1234. The advertiser can also add other events at 1231.

Once the budget management settings have been finalized, the advertiser-facing module displays the event settings at 1360 as seen in FIG. 13. The advertiser can select get new estimates at 1142 and the IMS will calculate new estimates based on the settings altered by the advertiser.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a machine or computer readable medium. The machine or computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a advertiser, embodiments of the subject matter described in this specification can be implemented on a computer having a display device, e.g., a CRT (cathode ray tube) or LCD (liquid crystal display) monitor, for displaying information to the advertiser and a keyboard and a pointing device, e.g., a mouse or a trackball, by which the advertiser can provide input to the computer. Other kinds of devices can be used to provide for interaction with a advertiser as well; for example, input from the advertiser can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical advertiser interface or a Web browser through which a advertiser can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the described embodiments. Accordingly, other embodiments are within the scope of the following claims.

What is claimed is:

1. A computer-implemented method comprising:
   receiving an advertising goal, including a marketing objective, for a broadcast advertising campaign;
   translating the advertising goal into one or more rules;
   automatically calculating, by a computer system, campaign settings, including a reach and a frequency, based on the one or more rules;
   determining, by the computer system, an allocation of an advertisement to advertising spots to achieve the determined campaign settings including the reach and the frequency;
   wherein the determining the allocation for allocating the advertisement to advertising spots to achieve the determined campaign settings including the reach and the frequency comprises determining a tier distribution of broadcasters in a market organized by rank, the tier distribution indicating allocation of spots across the broadcasters according to rank; and calculating, by the computer system, a minimum effective budget for each of a plurality of markets to achieve the calculated campaign settings.

2. The method of claim 1, further comprising allocating advertising spots in a broadcast advertising market based according to the allocation.

3. The method of claim 1, wherein the advertising goal, including the marketing objective, comprises one or more of brand maintenance, brand building, or a time sensitive promotion.

4. The method of claim 1, wherein the advertising goal comprises a target audience.

5. The method of claim 1, wherein the calculating the minimum effective budget is based on estimating a price of allocating advertisements to available inventory for each of the plurality of markets according to the campaign settings in order to achieve a target reach and a target frequency for the respective markets.

6. The method of claim 1, further comprising displaying each of the plurality of markets and the minimum effective budget for each market on a map-based user interface.

7. The method of claim 1, wherein the translating the advertising goal is according to a predetermined allocation strategy.

8. The method of claim 7, further comprising
receiving feedback data regarding the success of the campaign;
analyzing the feedback data; and
optimizing the allocation strategy based on to the feedback data.

9. A non-transitory computer-readable storage medium storing instructions, which, when executed by a processor, causes the processor to perform operations comprising:
receiving an advertising goal, including a marketing objective, or a broadcast advertising campaign;
translating the advertising goal into one or more rules;
automatically calculating campaign settings, including a reach and a frequency, based on the one or more rules;
determining an allocation for allocating an advertisement to advertising spots to achieve the determined campaign settings including the reach and the frequency;
wherein the determining the allocation for allocating the advertisement to advertising spots to achieve the determined campaign settings including the reach and the frequency comprises determining a tier distribution of broadcasters in a market organized by rank, the tier distribution indicating allocation of spots across the broadcasters according to rank; and
calculating a minimum effective budget for each of a plurality of markets to achieve the calculated campaign settings.

10. The computer readable medium of claim 9, the operations further comprising:
allocating advertising spots in a broadcast advertising market based according to the allocation.

11. The computer readable medium of claim 9, wherein the advertising goal, including the marketing objective, comprises one or more of brand maintenance, brand building, or a time sensitive promotion.

12. The computer readable medium of claim 9, wherein the advertising goal comprises a target audience.

13. The computer readable medium of claim 9, wherein the calculating the minimum effective budget is based on estimating a price of allocating advertisements to available inventory for each of the plurality markets according to the campaign settings in order to achieve a target reach and a target frequency.

14. The computer readable medium of claim 9, the operations further:
displaying each of the one or more markets and the minimum effective budget for each market on a map-based user interface.

15. The computer readable medium of claim 9, wherein the translating the advertising goal is according to a predetermined allocation strategy.

16. The computer readable medium of claim 9, the operations further receiving feedback data regarding the success of the campaign;
analyzing the feedback data; and
optimizing the allocation strategy based on to the feedback data.

17. A system comprising:
a server system including one or more servers;
one or more storage devices encoded with a program when run by the server system causes the server system to provide:
an advertiser-facing module configured to interface with an advertiser to receive an advertising goal for a broadcast advertising campaign;
a calculation module configured to perform operations including:
translating the advertising goal into one or more rules,
automatically calculating campaign settings, including a reach and a frequency, based on the one or more rules, and
determining an allocation for allocating an advertisement to advertising spots to achieve the determined campaign settings including the reach and frequency,
wherein the determining the allocation for allocating the advertisement to advertising spots to achieve the determined campaign settings including the reach and the frequency comprises determining a tier distribution of broadcasters in a market organized by rank, the tier distribution indicating allocation of spots across the broadcasters according to rank, and
calculating a minimum effective budget for each of a plurality of markets to achieve the calculated campaign settings;
an add-booking module configured to allocate advertisements based on the allocation to advertising slots in the selected markets; and
a broadcaster-facing module configured to interface with a broadcaster that broadcasts the advertisements.

* * * * *